United States Patent
Yamada et al.

(10) Patent No.: US 6,517,083 B2
(45) Date of Patent: Feb. 11, 2003

(54) LIP SEAL

(75) Inventors: Takeshi Yamada, Kariya (JP); Takayuki Imai, Kariya (JP); Takanobu Matsumoto, Takahashi (JP)

(73) Assignees: Kabushiki Kaisha Toyoda Jidoshokki Seisakusho, Kariya (JP); Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 09/845,830

(22) Filed: May 1, 2001

(65) Prior Publication Data

US 2002/0003336 A1 Jan. 10, 2002

(30) Foreign Application Priority Data

May 2, 2000 (JP) .................................... 2000-133234

(51) Int. Cl.⁷ ................................................ F16J 15/32
(52) U.S. Cl. ...................................... 277/562; 277/559
(58) Field of Search ................................ 277/559, 560, 277/562, 565

(56) References Cited

U.S. PATENT DOCUMENTS

| | | | | | |
|---|---|---|---|---|---|
| 4,336,945 A | * | 6/1982 | Christiansen et al. | ....... | 277/559 |
| 4,623,153 A | * | 11/1986 | Nagasawa | .................... | 277/551 |
| 4,834,397 A | * | 5/1989 | Shimasaki et al. | .......... | 277/564 |
| 5,149,106 A | * | 9/1992 | Takenaka et al. | ........... | 277/556 |
| 6,102,409 A | * | 8/2000 | Furuyama et al. | .......... | 277/559 |
| 6,199,869 B1 | * | 3/2001 | Furuyama et al. | .......... | 277/559 |
| 6,336,638 B1 | * | 1/2002 | Guth et al. | .................. | 277/500 |

* cited by examiner

*Primary Examiner*—Anthony Knight
*Assistant Examiner*—Michael Wayne White
(74) *Attorney, Agent, or Firm*—Jacobson Holman PLLC

(57) ABSTRACT

First pumping threads are formed on an inner circumferential surface of the seal lip portion of an elastomer lip member. The first pumping threads generate a pumping action in a leakage direction when a shaft rotates. A first resin lip member is arranged at a rear side of the elastomer lip member. Second pumping threads generate a pumping action in a direction opposite to the leakage direction when the shaft rotates. The second pumping threads are formed from an inner circumferential surface of a seal lip portion of the first resin lip member to a rear portion of a bent portion thereof. A second resin lip member is arranged at a rear side of the first resin lip member and has a surface sliding on the shaft, which is formed smoothly.

9 Claims, 5 Drawing Sheets

FIG. 2

| | Oil leakage amount | | lip sliding surface state (x20) | lip section state (x10) |
|---|---|---|---|---|
| Conventional structure | approximately 2g/h | elastomer lip member | | |
| | | resin lip member | | Excessive wear in bent portion |
| Present invention structure | approximately 0g/200hrs. | elastomer lip member | | |
| | | first resin lip member | | |

LIP SEAL

FIELD OF THE INVENTION

The present invention relates to a lip seal for sealing a shaft in various rotary machines, more particularly, a technology for improving a pressure resistance and a sealing capability under a condition that a pressure of sealing object fluid becomes high prominently.

DESCRIPTION OF THE RELATED ART

Conventionally, as a lip seal, there was one shown in FIG. 4 or FIG. 5. A lip seal 100 of this kind has a structure that an elastomer lip member 102, a pressure resisting reinforcement ring 103 which supports the elastomer lip member 102 from its rear side (a side opposite to an inner space of machine S1 of a sealing object), a resin lip member 104 arranged on the rear side of the pressure resisting reinforcement ring 103, and a back-up ring 105 which is additionally provided on the rear of the resin lip member 104 support their each outer diameter portion in a state closely adhered with each other on an inner circumference of a case 101 which is closely inserted and fixed in an inner circumference of an housing 1 through an O-ring 106 or a gasket portion 107.

In the lip seal 100 of this kind, the elastomer lip member 102 has pumping threads 102b for lubrication which cause a pumping action in a leakage direction according to the rotation of a rotating shaft 2 and are formed on an inner circumferential surface of a seal lip portion 102a of an inner diameter side extending to the inner space of machine S1 side, thereby, a leaking of high pressure fluid in the inner space of machine S1 side is prevented when the shaft stops, that is, said leakage direction pumping is not performed. On the other hand, the resin lip member 104 has pumping threads 104b which cause a pumping action in a direction which pushes and backs fluid toward the elastomer lip member 102 side when the shaft rotates and are formed on the inner circumferential surface of its seal lip portion 104a, that is, the leaking of a sealing object fluid in the inner space of machine S1 which has passed a sliding portion of the elastomer lip member 102 toward an atmosphere S2 side is prevented mainly when the shaft rotates.

The pumping threads 104b in the seal lip portion 104a of the resin lip member 104 are formed at only around a front end of a sliding surface with the rotating shaft 2. This is because that there is need to prevent the fluid from leaking toward the atmosphere S2 side after passing the pumping threads 104 which lose the pumping action in a leakage blocking direction when the shaft stops.

In the lip seal 100 of this kind, in high pressure condition which the pressure of the inner space of machine S1 is at least 1 MPa [gage], the resin lip member 104 receives an influence of said pressure, thus its section is deformed into approximately L-shape. And, in prior art, a stress of front end portion of the seal lip portion 104a in said deformation process is relatively small by the presence of the pumping threads 104b, and a stress generated in the vicinity of a bent portion 104c in which the pumping threads 104b are not formed is relatively large, thus a maximum portion of a surface pressure to the outer circumferential surface of the rotating shaft 2 is locally distributed toward said bent portion 104c side. Accordingly, the inner circumferential surface in the vicinity of the bent portion 104c is easily worn, and as a result, the front end portion in which the pumping threads 104b are formed causes a floating deformation on the outer circumferential surface of the rotating shaft 2. And, if this floating is caused, there has been a problem that a sealing function is lowered when the shaft stops because the pumping action in the leakage blocking direction by said pumping threads 104b is damaged.

SUMMARY OF THE INVENTION

The object of the present invention is to provide a lip seal which can prevent a front end portion of a resin lip member from being floating deformed on an outer circumferential surface of a rotating shaft, so that an excellent sealing function could be maintained for a long time.

A lip seal according to the present invention comprises an elastomer lip member which has a seal lip portion at an inner side, extending to a sealed space, the seal lip portion being brought into close contact with an outer circumferential surface of a rotating shaft; a first resin lip member which has a seal lip portion at an inner side and is arranged at a rear side of the elastomer lip member and has a bent portion at the inner side and extends to a sealed space, which is brought into close contact with an outer circumferential surface of the rotating shaft; and a second resin lip member having a seal lip portion of an inner side, which is arranged at a rear side of the first resin lip member and has a bent portion at the inner side, extending to a sealed space, which is brought into close contact with an outer circumferential surface of the rotating shaft. First pumping threads generate a pumping action in a leakage direction when the shaft rotates, which are formed on an inner circumferential surface of the seal lip portion of the elastomer lip member. Second pumping threads generate a pumping action in a direction opposite to the leakage direction when the shaft rotates, which are formed on the first resin lip member from an inner circumferential surface of the seal lip portion to a rear portion of a bent portion thereof. An inner circumferential surface of the second resin lip member is formed smoothly. And, the "rear" portion stated herein is a portion or surface opposite to the sealed space.

BRIEF DESCRIPTION OF THE DRAWINGS

FIG. 2 is a diagram showing test result.

DETAILED DESCRIPTION OF THE PREFERRED EMBODIMENTS

Figure 1:
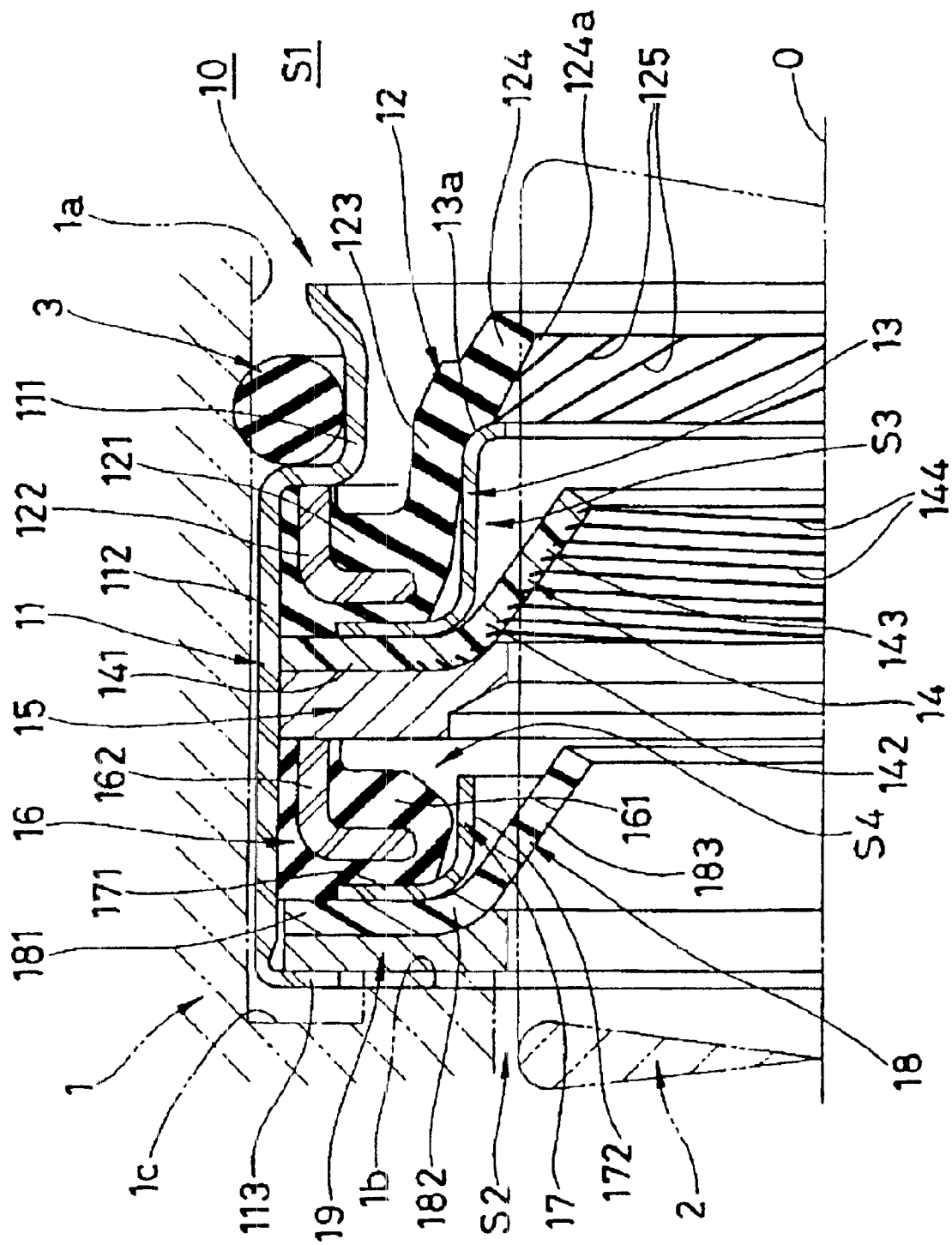
FIG. 1 is a half sectional view showing a preferred embodiment of a lip seal according to the present invention by cutting in a plane passing a shaft center.

FIG. 1 shows a preferred embodiment of a lip seal according to the present invention. In this figure, a reference numeral 1 is a shaft hole housing of a machinery. A reference numeral 2 is a rotating shaft that is inserted and passed an inner circumference of said housing 1 and rotates about a shaft center O. A reference numeral 10 is a lip seal.

The lip seal 10 seals the rotating shaft 2 between an inner space S1 of machine that is a sealed space and an atmosphere S2 side that is a side opposite to the sealed space. The lip seal 10 has a metal tubular case 11, an elastomer lip member 12 supported in its inner circumference, a pressure resisting metal back-up ring 13, a first resin lip member 14 made of a low frictional synthetic resin such as PTFE (polytetrafluoroethylene) and the like, a first metal back-up ring 15, a spacer 16, a metal guide ring 17, a second resin lip member 18 made of the low frictional synthetic resin such as PTFE and the like, and a second metal back-up ring 19.

The tubular case 11 has an O-ring mounting portion 111 formed in a concave shape toward the inner circumference side on an end potion of the inner space of machine S1 side and continuing circumferentially, a cylindrical main body portion 112 extending toward a side opposite to the inner space of machine S1 from the O-ring mounting portion 111, and a caulking portion 113 bent toward the inner diameter side on an end portion opposite to the O-ring mounting portion 111 of the cylindrical main body portion 112. And, the tubular case 11 is press fitted in the inner circumferential surface 1a of the housing 1 through an O-ring 3 mounted on said O-ring mounting portion 111.

The elastomer lip member 12 has an outer diameter base portion 121 in which a metal reinforcing ring 122 of approximately L-shape section is embedded, a main body portion 123 curving and extending toward the inner diameter side and the inner space of machine S1 side from the outer diameter base portion 121, and a seal lip portion 124 which an inner diameter edge 124a is brought into slide contact with the outer circumferential surface of the rotating shaft 2. Said outer diameter base portion 121 is brought into close contact with the inner circumferential surface of the cylindrical main body portion 112 in the tubular case 11 in an appropriate pressed state, thus functions as a gasket portion which maintains a gas tightness between the tubular case 11 and the elastomer lip member 12.

The pressure resisting reinforcement ring 13 made of a metal plate such as a steel plate and the like is formed a curved shape along a rear of the elastomer lip member 12, and a front end portion 13a bent toward the inner diameter side is reached at the rear of seal lip portion 124 of said elastomer lip member 12. That is, the pressure resisting reinforcement ring 13 restricts a deformation of the elastomer lip member 12 due to the fluid pressure of the inner space of machine S1 by supporting a portion spanning from the outer diameter base portion 121 of the elastomer lip member 12 to the main body portion 123 from its rear side. Further, it functions as a guiding means to expand the diameter of the seal lip portion 143 of the first resin lip member 14 into a cylindrical shape in the vicinity of the outer circumferential surface of said rotating shaft 2 when the lip seal 10 is inserted into the outer circumference of the rotating shaft 2.

The first resin lip member 14 shows a shape curving and extending from the inner circumference of an outer diameter portion 141 sandwiched and supported by the outer diameter base portion 121 of the elastomer lip member 12 and the outer diameter portion of the pressure resisting reinforcement ring 13, and the first back-up ring 15 to the inner space of machine S1 side, and the inner circumferential surface of its seal lip portion 143 is brought into close contact with the outer circumferential surface of the rotating shaft 2 at a position backed appropriately toward the atmosphere S2 side from the front end portion 13a of said pressure resisting reinforcement ring 13.

The first back-up ring 15 supports the outer diameter portion 141 and a curved portion 142 of the first resin lip member 14 from its rear side.

The spacer 16 is the one which a metal reinforcing ring 162 of approximately L-shape section is embedded in an annular elastomer member 161, interposes between the first back-up ring 15 and the outer diameter portion of the second resin lip member 18 and is brought into close contact with the inner circumferential surface of the cylindrical main body portion 112 in the tubular case 11 in an appropriate pressed state, thus functions as a gasket which maintains a gas tightness of this portion and at the same time, gives an appropriate gap between the first and the second resin lip members 14 and 18.

The guide ring 17 functions as a guiding means to expand the diameter of a seal lip portion 183 of the second resin lip member 18 into a cylindrical shape in the vicinity of the outer circumferential surface of said rotating shaft 2 when the lip seal 10 is inserted into the outer circumference of the rotating shaft 2, and comprises a radial portion 171 which is closely adhered on the rear of the spacer 16 and an inner circumference axial portion 172 which extends cylindrically from the inner circumferential side of said spacer 16 to the first back-up ring 15 side.

The second synthetic resin lip member 18 shows a shape curving and extending from the inner circumference of an outer diameter portion 181 sandwiched and supported by the rear of the spacer 16, and the radial portion 171 of the guide ring 17, and the second back-up ring 19 to the first resin lip member 14 side, and the inner circumferential surface of the seal lip portion 183 is brought into close contact with the outer circumferential surface of the rotating shaft 2 at a position retracted appropriately toward the atmosphere S2 side from the first back-up ring 15.

The second back-up ring 19 supports the outer diameter portion 181 and a curved portion 182 of the second resin lip member 18 from its rear side.

Said elastomer lip member 12, the pressure resisting reinforcement ring 13, the first resin lip member 14, the first back-up ring 15, the spacer 16, the guide ring 17, the second resin lip member 18 and the second back-up ring 19 are fixed between the O-ring mounting portion 111 and the caulking portion 113 of the tubular case 11 in a state that their outer diameter portions are axially closed with each other.

The elastomer lip member 12 has pumping threads 125 for lubrication which have a leakage direction by rotation of the rotating shaft 2, that is, the direction which causes a pumping action sending the fluid of the inner space of machine S1 side toward a rear space S3 of the seal lip portion 124 of the elastomer lip member 12 and are formed on the tapered inner circumferential surface formed on the rear side of the inner diameter edge 124a of a front end lip portion 124 which becomes a sliding portion with the outer circumferential surface of the rotating shaft 2.

The first resin lip member 14 has pumping threads 144 which have a leakage blocking direction by rotation of the rotating shaft 2, that is, the direction which generates a pumping pressure against a leakage pressure from said rear space S3 to a rear space S4 side of the first resin lip member 14 up to the rear position of the bent portion 142 at the front end of said seal lip portion 143 and are formed on the inner circumferential surface of the seal lip portion 143 which becomes a sliding surface with the outer circumferential surface of the rotating shaft 2.

In the second resin lip member 18, the inner circumferential surface of the seal lip portion 183 which becomes a sliding surface with the outer circumferential surface of the rotating shaft 2 is formed a smooth surface in which the pumping threads as stated above do not exist.

The lip seal 10 according to the above constitution has the tubular case 11 which is press fitted in the inner circumferential surface 1a of the housing 1 through the O-ring 3 in such a manner as to abut the rear of the second back-up ring 19 on a supporting surface 1b of housing 1. Further, in this state, the caulking portion 113 of said tubular case 11 is movably inserted into an annular recess portion 1c of the outer circumference of said supporting surface 1b.

While, in the first and the second resin lip members 14 and 18, the seal lip portions 143 and 183 are deformed to expand the diameter from a tapered shape shown in FIG. 1 to substantially cylindrical shape by making the pressure resisting reinforcement ring 13 and the guide ring 17 as guides by inserting and passing of the rotating shaft 2, thus its inner circumferential surface is brought into close contact with the outer circumferential surface of the rotating shaft 2. Further, the inner diameter edge 124a of the seal lip portion 124 of the elastomer lip member 12 has an appropriate squeeze and is brought into close contact with the outer circumferential surface of said rotating shaft 2 elastically.

When the shaft rotates, the pressure of the inner space of machine S1 functions to decrease the diameter of the main body portion 123 of the elastomer lip member 12, however, the portion spanning from the outer diameter base portion 121 to the main body portion 123 of the elastomer lip member 12 is supported from the rear side by the pressure resisting reinforcement ring 13, thus its deformation in the inner diameter direction by said pressure is restricted.

The seal lip portion 124 of the elastomer lip member 12 is not supported by the pressure resisting reinforcement ring 13, but the fluid of the inner space of machine S1 is actively introduced into the sliding surface of the seal lip portion 124 and the rotating shaft 2 by the leakage direction pumping action of pumping threads 125 for lubrication formed on said seal lip portion 124 and a thick fluid lubrication film is formed when the shaft rotates, thus a sliding load is reduced. Further, the fluid leakage from the rear space S3 of the elastomer lip member 12 to the rear space S4 of the first resin lip member 14 is blocked by the pumping action of reverse direction against said pumping threads 125 for lubrication by the pumping threads 144 formed on the seal lip portion 143 of the first resin lip member 14.

Further, by the leakage direction pumping action of the pumping threads 125 for lubrication of the elastomer lip member 12 and the leakage blocking direction pumping action of the pumping threads 144 of the first resin lip member 14, the pressure of the rear space S3 of the elastomer lip member 12 is stood against the pressure of the inner space of machine S1. Accordingly, the reduction of diameter of the seal lip portion 124 of the elastomer lip member 12 by the pressure of the inner space of machine S1 is restrained, thereby the sliding load is reduced.

Here, the pressure of the rear space S3 of the elastomer lip member 12 functions to reduce the diameter of the seal lip portion 143 of the first resin lip member 14, particularly in high pressure condition which the pressure of the inner space of machine S1 is at least 1 MPa [gage], the first resin lip member 14 receives the influence of the pressure and deformed approximately L-shape in section. However, the first resin lip member 14 has the pumping threads 144 which are formed from the inner circumferential surface of the seal lip portion 143 to the rear of the bent portion 142, thus the stress in the vicinity of the bent portion 142 is small and the fluid is to intervene in the inner circumferential surface in the vicinity of the bent portion 142 by the pumping action of the pumping threads 144, and a localized wear which the inner circumferential surface of the seal lip portion 143 is largely worn at the bent portion 142 is prevented. As a result, the deformation which the front end of the seal lip portion 143 is floated on the outer circumferential surface of the rotating shaft 2 is not caused, and the pumping action of the leakage blocking direction by the said pumping threads 144 is maintained.

Further, the first resin lip member 14 has the pumping threads 144 which are formed on the entire region of the sliding surface with the rotating shaft 2, thus the leakage blocking effect by the pumping threads 144 is more greater than the prior structure which the pumping threads are formed only on the inner circumferential surface in the vicinity of the front end of the seal lip portion, and accordingly, the sealing capability is improved when the shaft rotates.

Further, when the shaft stops, the pumping action of the leakage blocking direction by the pumping threads 144 formed on the first resin lip member 14 is lost, but because the leakage direction pumping by the pumping threads 125 for lubrication formed on the seal lip portion 124 of the elastomer lip member 12 is not performed, the seal lip portion 124 of the elastomer lip member 12 is brought into close contact with the outer circumferential surface of the rotating shaft 2 in a state that it collapses the lubrication pumping threads 125, and thus the leakage of the sealing object fluid from the inner space of machine S1 to the rear space S3 of the elastomer lip member 12 is blocked.

While, the first resin lip member 14 has the pumping threads 144 extending from the inner circumferential surface of the front end of the seal lip portion 143 to the rear of the bent portion 142, so that the fluid existing in the rear space S3 of the elastomer lip member 12 can be flowed out to the rear space S4 of the first resin lip member 14 through said pumping threads 144, but the seal lip portion 183 of the second resin lip member 18 which exists at its rear side is brought into close contact with the outer circumferential surface of the rotating shaft 2 on the smooth inner circumferential surface in which the pumping threads do not exist, thus a leakage of fluid from said rear space S4 toward the atmosphere S2 side is certainly blocked.

Figure 4:
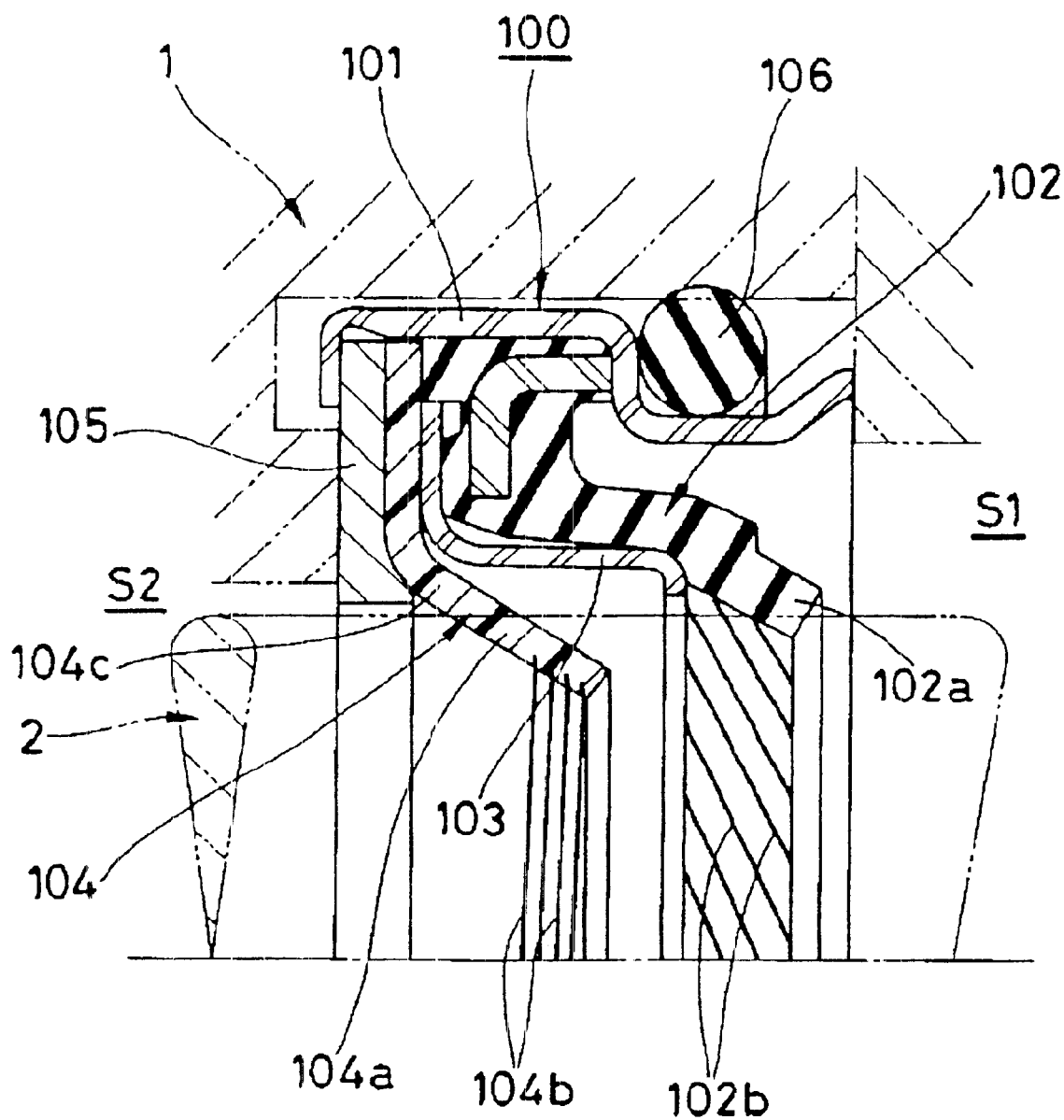
FIG. 4 is a half sectional view showing a conventional lip seal by cutting in a plane passing the shaft center.
Figure 5:
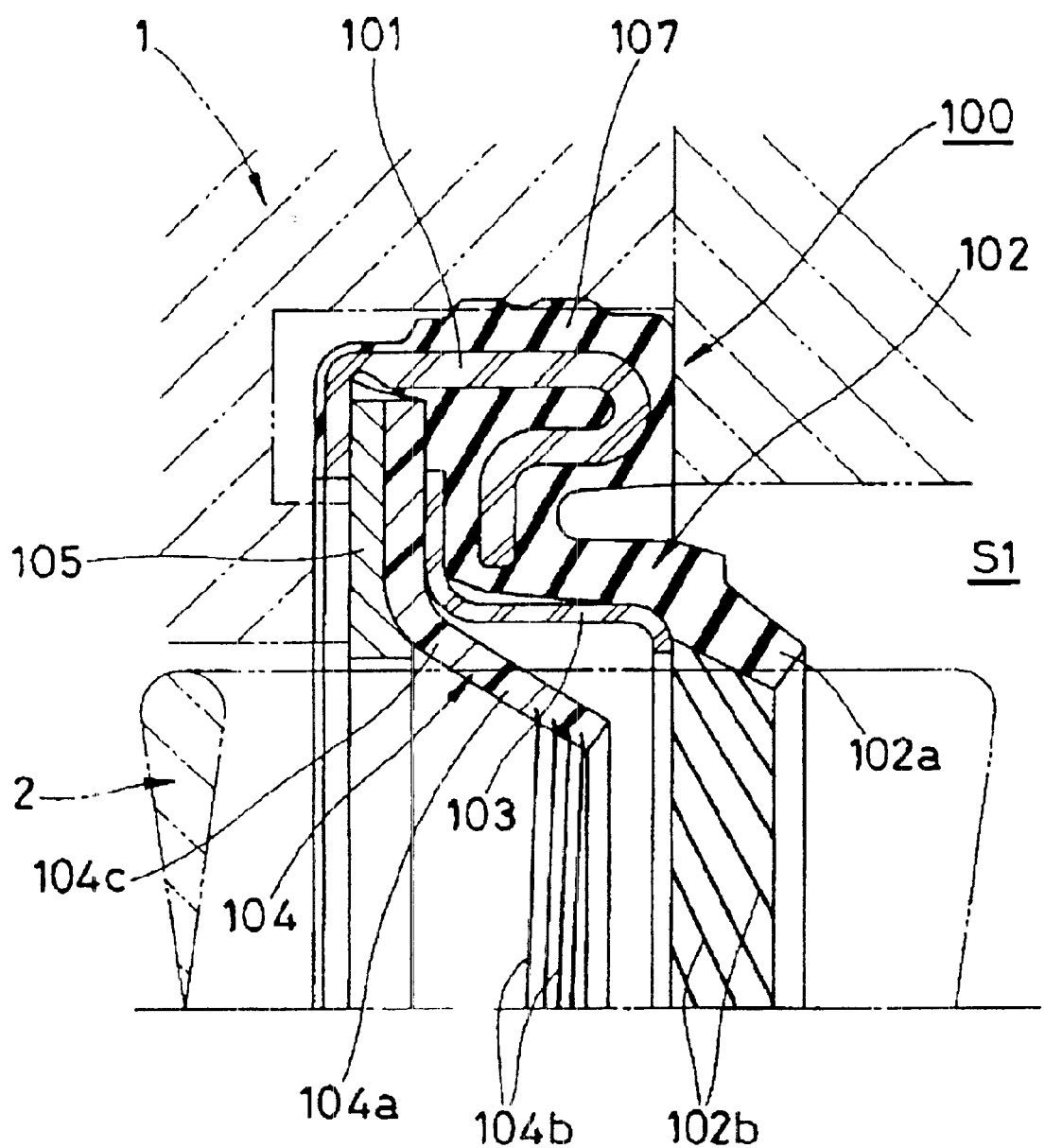
FIG. 5 is a half sectional view showing another conventional lip seal by cutting in a plane passing the shaft center.

FIG. 2 shows a result that a sliding test by the lip seal 10 of the structure shown in FIG. 1 and the lip seal 100 of the prior structure shown in FIG. 4 as described in above is performed in the following test condition.

[Test condition]
revolutions of rotating shaft: 5000 rpm
pressure of sealing space: 4 MPa [gage]
kind of sealing liquid: synthetic oil
temperature of sealing liquid: 100° C.
amount of sealing liquid: full in seal box (sealing space)
test time: 200 hours As a result of the test, in the lip seal of conventional structure, an oil leakage is generated in a short period of time. Further, as a result of confirming the elastomer lip member and the resin lip member of its rear side after sliding for 200 hours, a wear of the inner circumferential surface of the seal lip portion in the resin lip member is large in the vicinity of the bent portion, but, on the other hand, the wear is almost not confirmed in the vicinity of the front end of the seal lip portion, as shown in upper columns of FIG. 2. This is presumed that because the floating is caused from the outer circumferential surface of the rotating shaft in the vicinity of the front end of the seal lip portion.

While, in the lip seal by the structure of the present invention, the generation of oil leakage during operation period for 200 hours is not confirmed. Further, as a result confirming the elastomer lip member and the first resin lip member of its rear side after sliding for 200 hours, the wear of the inner circumferential surface of the seal lip portion in the first resin lip member shows that a satisfactory sliding state is maintained since the localized wear which increases the wear amount in the vicinity of the bent portion is not confirmed, as shown in lower columns of FIG. 2. This is presumed that because the pumping threads are extended to the rear of the bent portion, so that the stress of the bent portion is decreased in the first resin lip member, and the reason that the sealing capability is satisfactory is because the floating phenomenon is not generated in the vicinity of the front end of the seal lip portion and the region which the pumping action in the leakage blocking direction lengthened axially by the pumping threads.

Figure 3:
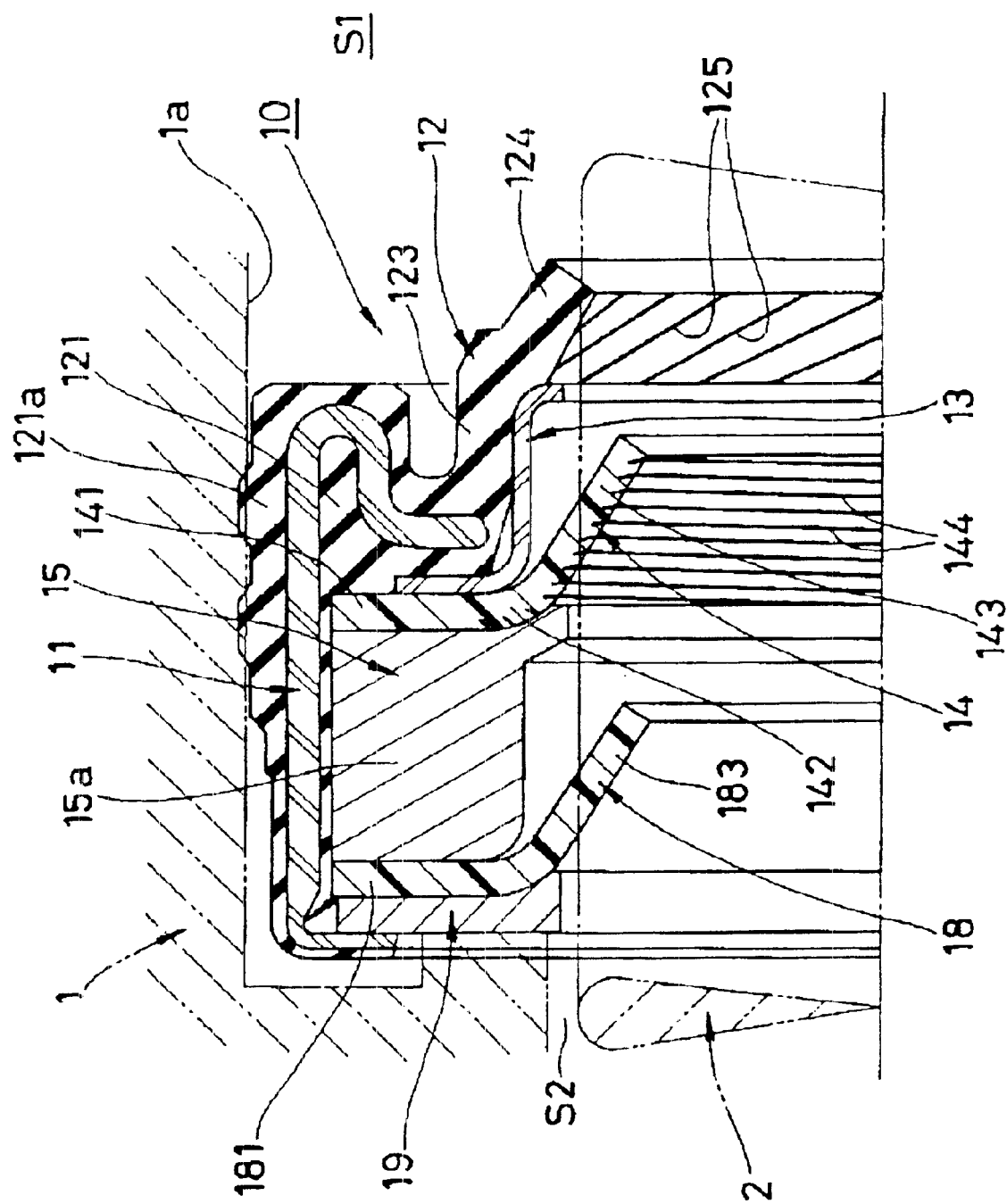
FIG. 3 is a half sectional view showing another embodiment of the lip seal according to the present invention by cutting in a plane passing the shaft center.

Next, FIG. 3 shows another embodiment of the lip seal 10 according to the present invention. That is, in the lip seal 10 shown in FIG. 3, the outer diameter base portion 121 of the elastomer lip member 12 is integrally vulcanized in the tubular case 11, and a vulcanized and bonded portion 121a to the outer circumference side of the tubular case 11 of said outer diameter base portion 121 functions as a sealing means with the inner circumferential surface la of the housing 1, so that mounting of O-ring as shown in FIG. 1 are not necessary.

Further, the first back-up ring 15 supporting the outer diameter portion 141 and the curved portion 142 of the first resin lip member 14 from its rear side is extended to a portion 15a corresponding to the outer diameter portion 141 of said first resin lip member 14 toward its rear side to be positioned close to the front of the outer diameter portion 181 of the second resin lip member 18. The portion 15a gives an appropriate gap between the first resin lip member 14 and the second resin lip member 18, and at the same time, when the lip seal 10 is inserted into the outer circumference of the rotating shaft 2, it functions as a guide means to bend the second resin lip member 18 in the vicinity of the outer circumferential surface of said rotating shaft 2, that is, combines the functions of the spacer 16 and the guide ring 17 shown in FIG. 1.

The constitution of the rest portion is basically the same with FIG. 1, that is, the lubrication pumping threads 125 causing the pumping action in the leakage direction when the shaft rotates are formed on the inner circumferential surface of the seal lip portion 124 of the elastomer lip member 12, and the pumping threads 144 causing the pumping action in the leakage blocking direction when the shaft rotates are formed on the first resin lip member 14 from the inner circumferential surface of the seal lip portion 143 to the rear of the bent portion 142, and the inner circumferential surface of the second resin lip member 18 is formed smoothly, so that the same effect with the above-mentioned is realized.

According to the lip seal of the present invention, when the shaft rotates, the pressure of the rear of the elastomer lip member stands against the pressure of the sealing space functioning in the front side, thus a satisfactory lubrication state of the elastomer lip member is maintained, and at the same time, the sliding load is restricted. Further, the first resin lip member has the pumping threads extending from the inner circumferential surface of the seal lip portion to the rear of the bent portion, thus the stress in the vicinity of the bent portion is decreased, and the localized wear by which the inner circumferential surface of the seal lip portion is worn largely at the bent portion side is prevented, and as a result, the floating of the front end of the seal lip portion is prevented and the pumping action in leakage blocking direction is maintained, and thus an excellent sealing function is achieved.

What is claimed is:
1. A lip seal comprising:
an elastomer lip member having a seal lip portion,
first pumping thread means formed on an inner circumferential surface of the seal lip portion of the elastomer lip member,
the first pumping thread means generating a pumping action in a leakage direction when a shaft rotates,
a first resin lip member arranged at a rear side of the elastomer lip member, and
a second pumping thread means for generating a pumping action in a direction opposite to the leakage direction when a shaft rotates.
2. A lip seal as defined in claim 1, wherein the second pumping thread means is formed from an inner circumferential surface of a seal lip portion of the first resin lip member to a rear portion of a bent portion of the first resin lip member.
3. A lip seal as defined in claim 1, wherein a second resin lip member is formed at a rear side of the first resin lip member.
4. A lip seal as defined in claim 3, wherein the second resin lip member has a sliding surface sliding on the shaft, which is formed smoothly.
5. A lip seal comprising:
an elastomer lip member having a seal lip portion at an inner side, which extends to a sealed space side and is brought into contact with an outer circumferential surface of a rotating shaft;
a first resin lip member having a seal lip portion arranged at a rear side of the elastomer lip member, the seal lip portion extending from a bent portion to the sealed space, the seal lip portion being brought into contact with an outer circumferential surface of the rotating shaft;
a second resin lip member having a seal lip portion at an inner side, which is arranged at a rear side of the first resin lip member and extends from a bent portion to the sealed space, the seal lip portion being brought into contact with an outer circumferential surface of the rotating shaft;
first pumping threads means for generating a pumping action in a leakage direction when the shaft rotates, the first pumping thread being formed on an inner circumferential surface of the seal lip portion of the elastomer lip member, and
second pumping thread means for generating a pumping action in a direction opposite to the leakage direction when the shaft rotates, the second pumping thread means being formed on the first resin lip member from an inner circumferential surface of the seal lip portion of the first resin lip member to a rear portion of the bent portion thereof,
wherein an inner circumferential surface of the second resin lip member is formed smoothly.
6. A lip seal as defined in claim 1, wherein a rear space is formed at a rear portion of the seal lip portion of the elastomer lip member.
7. A lip seal as defined in claim 6, wherein the first pumping thread means makes fluid in an inner space flow into the rear space.
8. A lip seal as defined in claim 6, wherein the second pumping thread means shuts out fluid in the rear space, which flows toward atmosphere.
9. A lip seal as defined in claim 6, wherein a pressure in the rear space becomes substantially equal to a pressure in the inner space by means of fluid which is supplied by the first and second pumping thread means.

* * * * *